United States Patent
Rudd, III (10) Patent No.: US 8,016,366 B2
(45) Date of Patent: Sep. 13, 2011

(54) DIFFERENTIAL BRAKE CONTROL AND WEIGHTED AVERAGE WHEEL SPEED FOR BRAKE CONTROL SYSTEM

(75) Inventor: Robert E. Rudd, III, Panton, VT (US)

(73) Assignee: Goodrich Corporation, Charlotte, NC (US)

( * ) Notice: Subject to any disclaimer, the term of this patent is extended or adjusted under 35 U.S.C. 154(b) by 1146 days.

(21) Appl. No.: 11/752,947

(22) Filed: May 24, 2007

(65) Prior Publication Data

US 2008/0001471 A1 Jan. 3, 2008

Related U.S. Application Data

(60) Provisional application No. 60/803,725, filed on Jun. 2, 2006, provisional application No. 60/803,727, filed on Jun. 2, 2006, provisional application No. 60/803,728, filed on Jun. 2, 2006.

(51) Int. Cl.
B60T 8/78 (2006.01)
(52) U.S. Cl. .................................... 303/147; 303/126
(58) Field of Classification Search .................. 303/140, 303/146, 155, 189, 195, 147, 167; 701/16, 701/41, 70, 72
See application file for complete search history.

(56) References Cited

U.S. PATENT DOCUMENTS

| | | | | |
|---|---|---|---|---|
| 4,482,961 | A * | 11/1984 | Kilner et al. | 701/16 |
| 5,010,489 | A | 4/1991 | Masaki et al. | |
| 5,024,491 | A * | 6/1991 | Pease et al. | 303/195 |
| 5,964,822 | A * | 10/1999 | Alland et al. | 701/301 |
| 6,021,367 | A * | 2/2000 | Pilutti et al. | 701/41 |
| 7,143,864 | B2 * | 12/2006 | Mattson et al. | 180/446 |
| 7,286,909 | B2 * | 10/2007 | Darke | 701/3 |
| 2003/0111899 | A1 | 6/2003 | Heinemann | |
| 2005/0231031 | A1 | 10/2005 | Bellouard et al. | |
| 2006/0186267 | A1 | 8/2006 | Steiner et al. | |
| 2007/0252036 | A1 * | 11/2007 | Steiner et al. | 244/111 |

FOREIGN PATENT DOCUMENTS

DE 4428347 2/1996

OTHER PUBLICATIONS

EP; Search Report dated May 20, 2010 in Application No. 07109326.4.

* cited by examiner

*Primary Examiner* — Christopher Schwartz
(74) *Attorney, Agent, or Firm* — Snell & Wilmer L.L.P.

(57) ABSTRACT

A differential brake control system is provided for a vehicle having first and second wheels on respective sides of a vertical axis of the vehicle. The system includes processing logic for computing a wheel brake command based on an input brake command indicative of a desired amount of braking. In addition, the system includes differential logic for adjusting the wheel brake command by first and second amounts to produce first wheel and second wheel brake commands, respectively, the first amount being different from the second amount.

18 Claims, 8 Drawing Sheets

DIFFERENTIAL BRAKE CONTROL AND WEIGHTED AVERAGE WHEEL SPEED FOR BRAKE CONTROL SYSTEM

This application claims priority under 35 USC §119 to U.S. Provisional Application Nos. 60/803,725; 60/803,727; and 60/803,728, each filed on Jun. 2, 2006, the entire disclosures of which are incorporated herein by reference.

TECHNICAL FIELD

The present invention relates generally to brake control systems, and more particularly to a differential brake control system particularly suited for unmanned aircraft. In addition, the invention relates to a weighted average wheel speed for use in brake control systems.

BACKGROUND OF THE INVENTION

Differential brake control involves providing individual brake commands of different degree to respective wheels of a vehicle. In the case of aircraft, for example, pilots have the ability to control direction of the aircraft not only using nose wheel steering and rudder movement. The pilot may also control the direction by pushing the left and right brake pedals by differing amounts to effect differential braking with respect to the left and right wheels of the aircraft.

Generally speaking, to move a vehicle back to a centerline, it is necessary to turn, or yaw, the vehicle. In order to obtain a yaw, it is necessary to have a yaw rate. To obtain a yaw rate, it is necessary to apply a torque (moment) about the vertical axis of the vehicle. Differential brake control provides the capability to turn the vehicle by applying a torque via different amounts of braking to wheels on opposite sides of the vertical axis.

Accordingly, a pilot wishing to turn an aircraft during taxiing, landing, etc., can implement such turn by applying the above principles of differential brake control. The pilot presses individual brakes for left and right wheels by differing amounts in order to create the necessary torque to turn the plane. The rate and amount by which the braking to the left and right wheels differ determines how quickly and in what direction the aircraft will tend to turn.

The use of differential brake control in aircraft is an effective way to turn an aircraft. However, differential brake control in the past has been largely dependent on the pilot to implement such control manually by way of pressing the left and right brake pedals by differing amounts. There are three ways a pilot can initiate a turn. The pilot may lift one pedal and release the other the same amount to maintain the current deceleration. The pilot may push one pedal harder with the collateral effect of increasing overall deceleration. Conversely, the pilot may also desire to lift one pedal with the collateral effect of decreasing overall deceleration.

In view of the aforementioned shortcomings associated with conventional differential brake control, there is a strong need in the art for a brake control system capable of providing automated differential brake control. Still further, there is a strong need in the art for a brake control system operative to provide automated differential brake control in an aircraft independent of a pilot, such as in an unmanned aircraft. In addition, there is a strong need in the art for a brake control system that is less susceptible to differences in wheel speed due to asymmetries on the aircraft and in the environment.

SUMMARY OF THE INVENTION

According to an aspect of the invention, a differential brake control system is provided for a vehicle having first and second wheels on respective sides of a vertical axis of the vehicle. The system includes processing logic for computing a wheel brake command based on an input brake command indicative of a desired amount of braking. In addition, the system includes differential logic for adjusting the wheel brake command by first and second amounts to produce first wheel and second wheel brake commands, respectively, the first amount being different from the second amount.

According to another aspect, the first and second amounts are a function of a measured yaw of the vehicle.

In accordance with another aspect, the first and second amounts are a function of a measured yaw rate.

According to yet another aspect, the first and second amounts are a function of a measured lateral offset of the vehicle relative to a centerline.

In accordance with still another aspect, the differential logic compares the lateral offset with a desired position of the vehicle relative to the centerline to produce a yaw command.

According to another aspect, the differential logic compares the yaw command with the measured yaw of the vehicle to produce a yaw rate command.

In yet another aspect, the differential logic compares the yaw rate command with the measured yaw rate to produce a yaw rate error.

According to another aspect, the first and second amounts are determined based on the yaw rate error.

In still another aspect, the differential logic adjusts the wheel brake command by the first and second amounts by applying first and second scaling factors, respectively.

According to another aspect, the first scaling factor represents unity gain and the second scaling factor represents non-unity gain.

In yet another aspect, the differential logic adjusts the wheel brake command by the first and second amounts by adding a differential component to the wheel brake command to produce the first wheel brake command, and subtracting a differential component from the wheel brake command to produce the second wheel brake command.

In accordance with still another aspect, brake gain adjustment logic effectively adjusts the magnitude of the wheel brake command as a function of the degree of differential braking between the first wheel and second wheel brake commands.

According to another aspect, the brake gain adjustment logic effectively reduces the magnitude of the wheel brake command in response to an increase in the degree of differential braking.

In yet another aspect, the magnitude of the wheel brake command is effectively reduced by approximately 50% during full differential braking.

According to still another aspect, a logic system is provided for computing a weighted average wheel speed among at least a left wheel and a right wheel undergoing anti-skid brake control. The system includes an input for receiving measured wheel speeds of the left wheel and the right wheel, and processing logic for computing a weighted average wheel speed w_ave represented as follows:

$$w\_ave = kl \cdot w\_left + kr \cdot w\_right$$

where
  w_left is the measured wheel speed of the left wheel;
  w_right is the measured wheel speed of the right wheel;
  kl is a left weighting factor; and
  kr is a right weighting factor,
wherein the left weighting factor kl and the right weighting factor kr vary as a function of a difference in the measured wheel speeds of the left wheel and the right wheel.

In accordance with another aspect, the weighting factors kl and kr are selected so as to have the properties:
  kl=1 and kr=0 when left wheel is locked;
  kr=0 and kl=1 when right wheel is locked; and
  kl=kr=0.5 when the wheel speeds are equal.

According to another aspect, the left weighting factor kl and the right weighting factor kr vary as a function of a difference over sum (dos) of the left wheel speed and the right wheel speed.

In accordance with still another aspect, the left weighting factor kl and the right weighting factor kr vary as a function of the dos combined with a non-linear component.

In accordance with yet another aspect, the non-linear component is represented by a parabola.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described in detail with reference to the drawings, wherein like reference labels are used to refer to like elements throughout.

Figure 1:
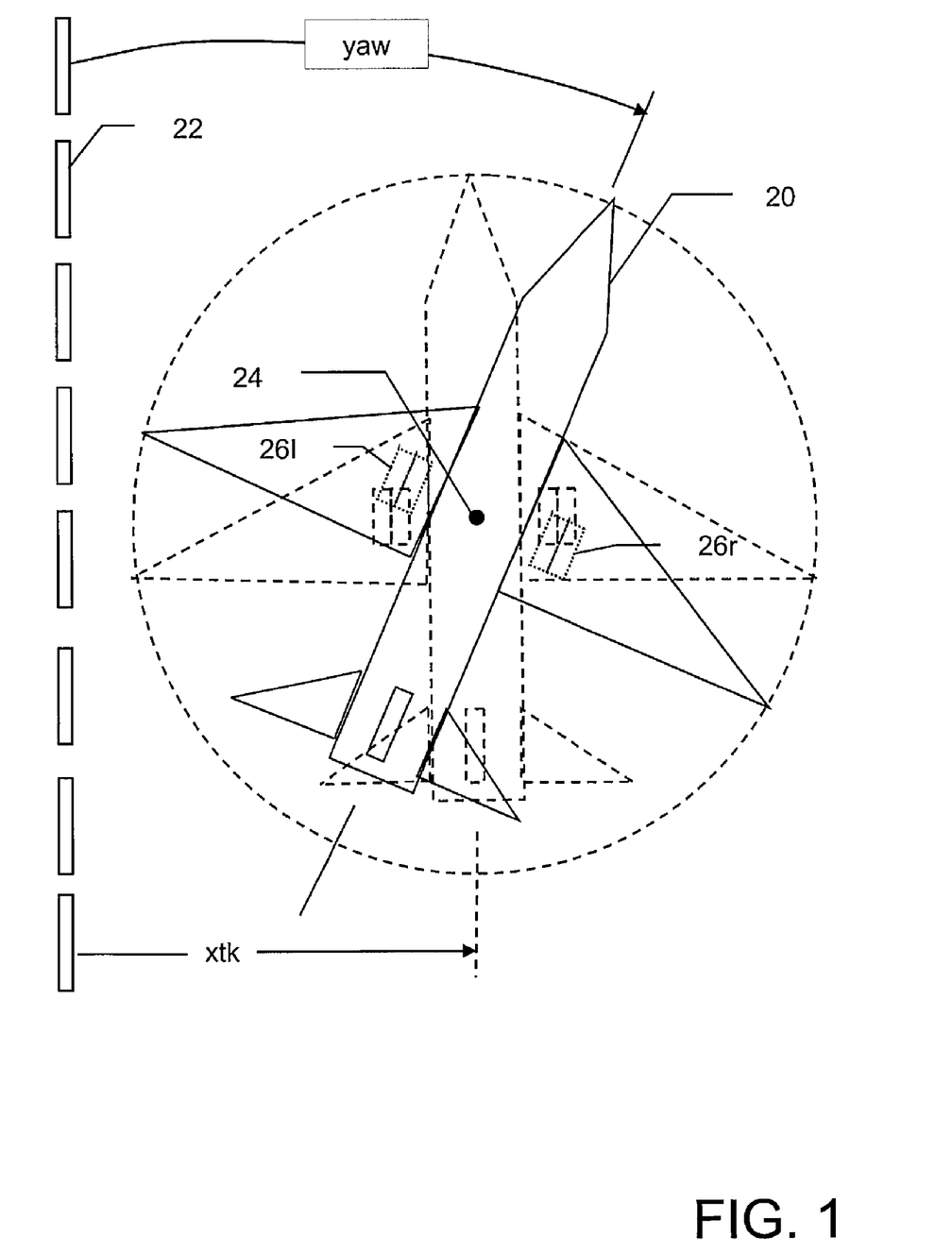
FIG. 1 illustrates an aircraft in relation to its yaw and cross-track position.

Referring initially to FIG. 1, an aircraft 20 is shown for use in accordance with the invention. As will be appreciated, the present invention is described herein in the context of a brake control system for an aircraft. However, the brake control system of the present invention may be applied to any type of vehicle for which differential brake control is desired.

In FIG. 1, a centerline 22 represents a desired or intended path of the aircraft 20. The centerline 22 may literally be a line visually marked on the runway on which the aircraft 20 is traveling. On the other hand, the centerline 22 does not necessarily need to be represented by a visual marking. Instead, for example, the centerline 22 may be represented by a set of geographic points arranged along the intended path of the aircraft 20. Such points may be represented by a collection of global positioning system (GPS) coordinates as will be appreciated.

As is known, the yaw of an aircraft or other vehicle represents the amount of rotation about a vertical axis. For example, the aircraft 20 of FIG. 1 has a vertical axis 24 about which yaw is measured. For purposes of the description of the invention as described herein, the yaw of the aircraft 20 is measured by the amount the aircraft 20 is rotated relative to parallel with the centerline 22. Thus, as shown in FIG. 1, the dashed outline of the aircraft 20 represents zero yaw. The solid line illustrates the aircraft 20 exhibiting a non-zero yaw. For purposes of the description provided herein, yaw is considered positive in the rightward direction represented in FIG. 1, and yaw is considered negative in the leftward direction.

The aircraft 20 includes a set of one or more wheel and brake assemblies 26l on the left side of the vertical axis 24 and a set of one or more wheel and brake assemblies 26r on the right side of the vertical axis 24. As will be appreciated by those having ordinary skill in the art, when the wheels of the aircraft 20 are on the ground, the yaw of the aircraft 20 may be controlled by applying "differential braking", or brake torque of different amounts, to the wheels on the left and right side of the vertical axis 24.

Cross-track position as illustrated in FIG. 1 represents the amount by which the aircraft 20 is offset laterally from the centerline 22. For example, the aircraft 20 is offset to the right of the centerline 22 by an amount "xtk". For purposes of description of the invention herein, cross-track position is considered positive to the right of the centerline 22, and negative to the left of the centerline 22 as viewed in FIG. 1.

As is will described in more detail below, the brake control system of the present invention provides differential brake control so as to effectively "steer" the aircraft 20 via differential braking. By performing such "steering", the present invention is able to control the yaw and/or cross-track position of the aircraft 20. As discussed below, the brake control system provides differential brake control in a manner that is particularly suited for use in unmanned vehicles such as an unmanned aircraft.

Figure 2:
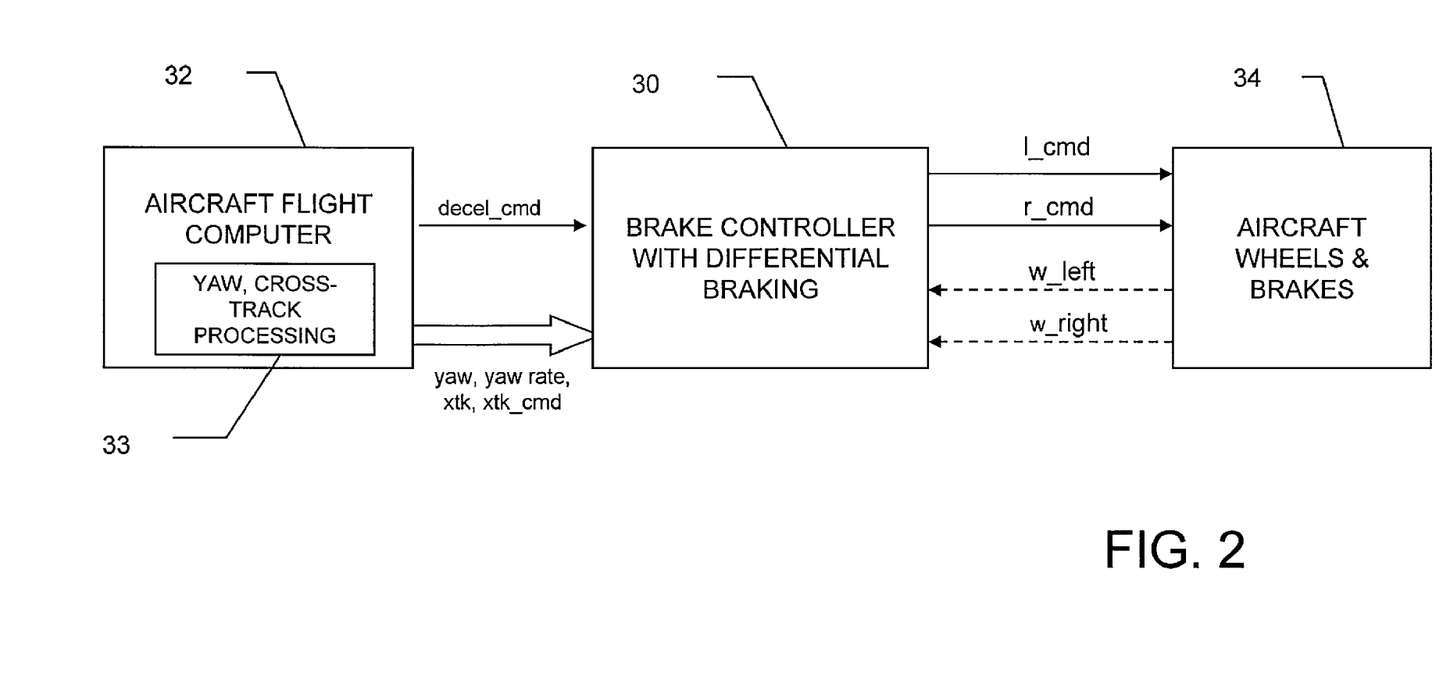
FIG. 2 is a simplified block diagram of a brake control system with differential brake control in accordance with the present invention.

Turning now to FIG. 2, shown is a simplified block diagram of a brake control system 30 in accordance with the present invention as employed in the aircraft 20. In the exemplary embodiment, the brake control system 30 receives control information from the aircraft flight computer 32. Specifically, the aircraft flight computer 32 provides an input brake command "decel_cmd" indicative of a desired amount of braking, to the brake control system 30. In addition, the aircraft flight computer 32 provides yaw and cross-track information to the brake control system. Such information includes the yaw and yaw rate of the aircraft 20. In addition, such information includes the cross-track position "xtk" of the aircraft 20 and the desired cross-track position command "xtr_cmd".

The input brake command "decel_cmd" may be based on the amount of braking called on by the pilot, e.g., by virtue of pressing upon the brake pedals. In another embodiment, however, the aircraft 20 may be an unmanned aircraft such as a military drone. The aircraft flight computer 32 may compute the input brake command "decl_cmd" based on the air speed of the aircraft, runway length, etc.

As is described in more detail below, a differential brake control value "dbc" is indicative of the desired amount of differential braking based on the yaw and cross-track position "xtk" of the aircraft 20. The yaw, yaw rate, cross-track position "xtk" and cross-track position command "xtk_cmd" are determined within the aircraft flight computer 32, and specifically are provided via a yaw and cross-track processing block 33. For example, the yaw and cross-track processing block 33 may include a Guidance, Navigation and Control (GNC) function for determining such values. Yaw, yaw rate and cross-track position "xtk" may be determined in any suitable manner without departing from the scope of the invention. For example, the yaw, yaw rate and cross-track position of the aircraft 20 may be determined using an Internal Navigation System (INS), GPS, or Attitude Heading Reference System (AHRS) included in the yaw and cross-track processing block 33. The yaw, yaw rate and/or cross-track position "xtk" may be determined visually (e.g., via machine vision techniques) in the case of a visible centerline 22, for example. Alternatively, the yaw, yaw rate and/or cross track position "xtk" may be determined based on a comparison of the GPS coordinates of the aircraft 20 relative to the GPS coordinates of the centerline 22, for example. The aircraft flight computer 32 may measure the GPS coordinates of the aircraft 20 via an onboard GPS transceiver as is known. The GPS coordinates of the centerline 22 may be downloaded and stored in memory of the aircraft flight computer 32, for example. The cross-track command "xtr_cmd" may be based on pilot input, navigational control of the aircraft by the aircraft flight computer 32, or the like.

In accordance with the various examples described herein with respect to FIGS. 3-6, the brake control system 30 processes the input brake command "decel_cmd", "yaw", "yaw rate", cross-track position "xtk" and cross-track command "xtk cmd" to produce left wheel and right wheel brake command signals "l_cmd" and "r_cmd", respectively. The l_cmd and r_cmd wheel brake command signals are based on the input brake command decal_cmd, and include a differential component which enable the aircraft 20 to "steer" itself effectively with respect to the desired yaw and cross-track.

Specifically, the l_cmd and r_cmd wheel brake command signals are provided to the aircraft wheel and brake assemblies 34. The wheel brake command signals serve to drive the corresponding actuators of the left and right wheel brake assemblies 26l and 26r, thus effecting a braking torque to the respective wheels. By applying a larger brake torque on one side of the aircraft 20 compared to the other side, the aircraft 20 will tend to turn toward the side of the larger brake torque as will be appreciated by those having ordinary skill in the field of differential braking.

As is shown in FIG. 2, the brake control system 30 may receive feedback from the aircraft wheels and brakes 34 in the form of wheel speed or the like. For example, in some embodiments of the invention, the wheel speed of the wheels in the assemblies 26l and 26r is fed back to the brake control system 30 for providing closed-loop brake control. As is discussed in more detail below, the wheel speed feedback signals may be utilized in accordance with conventional brake control techniques. Alternatively, they may be utilized as part of a weighted average wheel speed in accordance with another aspect of the invention.

Figure 3:
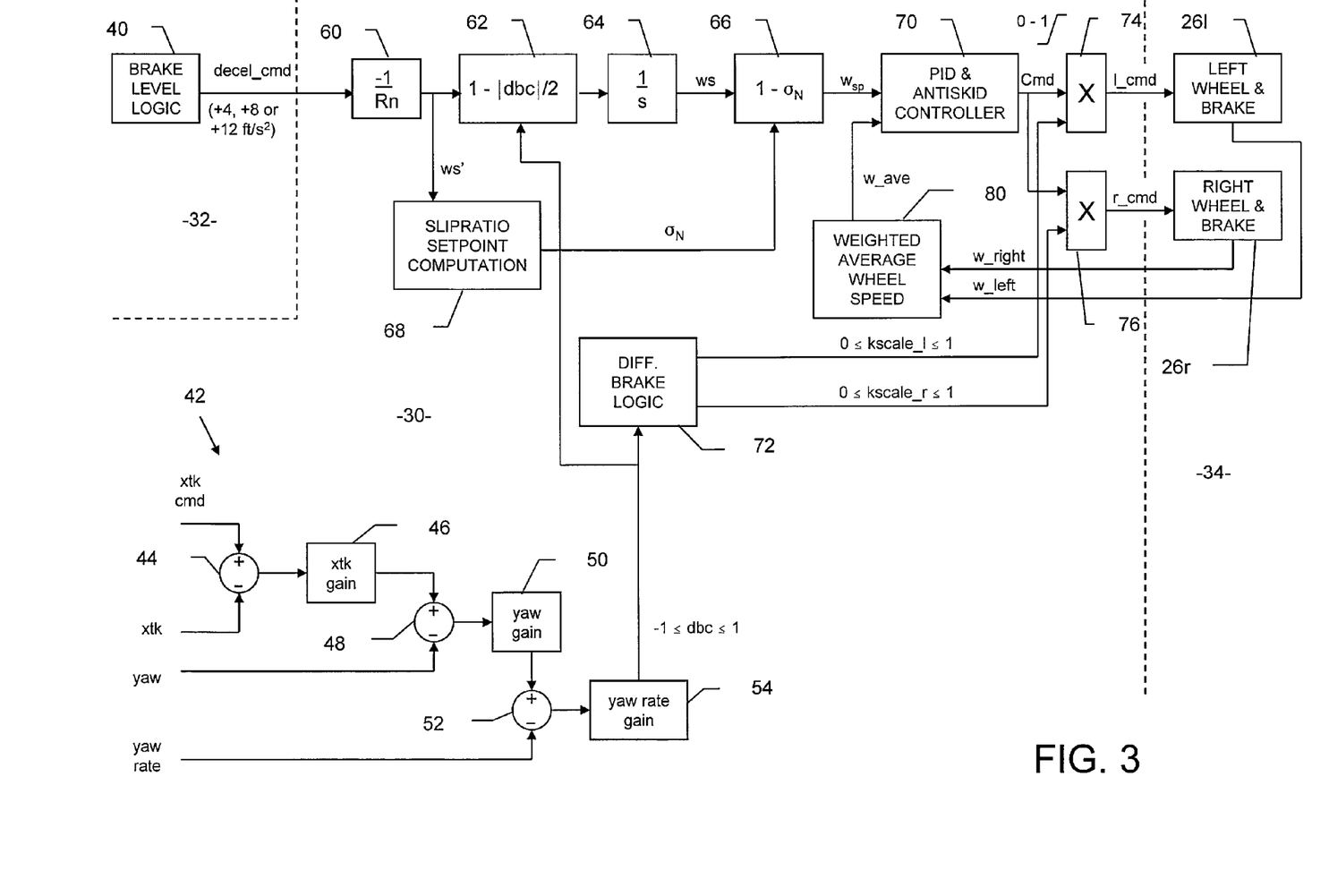
FIG. 3 is a block diagram of a brake control system with differential brake control in accordance with a first exemplary embodiment of the present invention.

Referring now to FIG. 3, a first embodiment of the brake control system 30 is shown. Brake level logic 40 included in the aircraft flight computer 32 provides the input brake command "decel_cmd" to the brake control system 30. As previously noted, the input brake command decel_cmd may be based on the amount of depression of the aircraft brake pedals in the case of a manned aircraft 20. In the case of an unmanned aircraft 20, the aircraft flight computer 32 may compute the input brake command decel_cmd. According to the exemplary embodiment, the input brake command decel_cmd takes on one of three different discrete braking levels, namely +4, +8 or +12 feet/second$^2$ (ft/s$^2$). However, it will be appreciated that in another embodiment the system may be designed such that the input brake command decel_cmd may take on other different or additional levels without departing from the scope of the invention.

The brake control system 30 includes a computation section 42 for calculating a differential brake control value "dbc". The computation section 42 includes a summing junction 44 which compares the cross-track command signal xtk_cmd to the actual cross-track position xtk as provided by the aircraft flight computer 32. The cross-track command signal xtk_cmd represents the desired cross-track position as determined by pilot input, navigational control by the aircraft flight computer 32, etc. The output of the summing junction 44 represents the cross-track error, or the difference between the desired cross-track position and the measured cross-track position.

The cross-track error signal from the summing junction 44 is input to a cross-track gain amplifier 46 that amplifies the error signal by a predefined amount selected in accordance with the desired responsiveness of the control system. The output of the cross-track gain amplifier 46 represents in effect the yaw command desired for correcting the cross-track error incurred by the aircraft 20. The yaw command is entered into a summing junction 48 which compares the yaw command from the cross-track gain amplifier 46 with the actual yaw of the aircraft 20 as provided by the aircraft flight computer 32 as discussed above. The output of the summing junction 48 thereby represents the yaw error, or the difference between the desired yaw and the measured yaw of the aircraft.

The yaw error is input to a yaw gain amplifier 50 that amplifies the yaw error by a predefined amount again selected in accordance with the desired responsiveness of the control system. The output of the yaw gain amplifier 50 represents the yaw rate command of the system, or namely the rate at which the system desires to correct any error in the yaw of the aircraft 20. The yaw rate command is input to a summing junction 52 that compares the yaw rate command with the actual yaw rate of the aircraft 20 as provided by the aircraft flight computer 32. Specifically, the aircraft flight computer 32 measures the yaw rate, or the rate at which the yaw of the aircraft 20 is changing and provides such information to the summing junction 52.

Accordingly, the output of the summing junction 52 represents the yaw rate error of the aircraft 20, which is indicative of the rate at which the system desires to correct the yaw of the aircraft 20. The yaw rate error is input to a yaw rate amplifier 54. In the exemplary embodiment, the yaw rate amplifier 54 scales the yaw rate error so as to output a range limited differential brake control value "dbc". Specifically, the gain of the yaw rate amplifier 54 is selected such that $-1 \leq dbc \leq +1$.

Referring again to the output of the brake level logic 40, the input brake command decel_cmd is input to a multiplier 60 included in the brake control system 30. The multiplier 60 multiplies the requested deceleration value by −1/Rn, where Rn represents the radius of the wheels being braked. Consequently, the output of the multiplier 60 represents the wheel speed deceleration ws' desired to effect the requested braking.

The desired wheel speed deceleration ws' is input to brake gain adjustment logic 62 that effectively adjusts the wheel brake command provided to the wheels as a function of the degree of differential braking. According to the exemplary embodiment, the wheel speed deceleration ws' is multiplied by the brake gain adjustment logic 62 by a value represented by 1−|dbc|/2. Thus, if dbc=±1, the brake gain adjustment logic 62 multiplies ws' by 0.5. On the other hand, if dbc=0, the brake gain adjustment logic 62 multiplies ws' by 1.0. Consequently, it will be appreciated that the requested deceleration as represented by ws' can be reduced up to 50% as a function of the amount of differential braking being called upon by the brake control system 30. It will be appreciated that an amount different from 50% may be chosen without departing from the scope of the invention.

The output of the brake gain adjustment logic 62 is input to an integrator block 64 which integrates the scaled value of ws' to produce a wheel speed ws representative of the speed a synchronous (unbraked) wheel will turn. The output of the integrator block 64 is input to a slip ratio block 66 for providing a desired amount of slip as part of antiskid brake control in accordance with the present invention. The slip ratio block 66 multiplies the synchronous speed ws by 1−$\sigma_N$, where $\sigma_N$ represents a desired slip ratio setpoint. The slip ratio setpoint $\sigma_N$ is itself calculated by a slip ratio setpoint computation block 68 included in the brake control system 30. Using conventional techniques not necessarily germane to the present invention, the slip ratio setpoint computation block 68 computes the slip ratio setpoint $\sigma_N$ based on the desired wheel speed deceleration ws'. The slip ratio setpoint computation block 68 in turn provides the slip ratio setpoint $\sigma_N$ to the slip ratio block 66.

The output of the slip ratio block 66 thus represents the wheel speed setpoint $w_{sp}$ for conventional and antiskid brake control of the aircraft via a PID and antiskid controller 70 included in the brake control system 30. The particular operation of the PID and antiskid controller 70 is not germane to the present invention, and therefore detailed description of its operation has been omitted for sake of brevity.

The output of the PID and antiskid controller 70 represents the wheel brake command Cmd as used conventionally to drive the actuators within the left and right wheel and brake assemblies 26l and 26r. The wheel brake command Cmd as output by the PID and antiskid controller 70 is limited in range to between 0 and 1 in the exemplary embodiments (representing zero to full braking). However, it will be appreciated that the wheel brake command Cmd as output may be scaled to whatever range as appropriate based on the particulars of the brake system.

In accordance with the present invention, the wheel brake command Cmd is adjusted by first and second amounts to produce first wheel and second wheel brake commands l_cmd and r_cmd, respectively. In order to effectuate differential braking, the first amount differs from the second amount based on the differential brake control value "dbc".

More particularly, the above-described differential brake control value dbc is input to a differential brake control logic block 72 included in the brake control system 30. According to the exemplary embodiment, the differential brake control logic block 72 employs the following logic to output left and right scaling command kscale_l and kscale_r, respectively:

```
If dbc > 0 (right turn)
    dbc_left = dbc;
    dbc_rt = 0;
else if dbc < 0 (left turn)
    dbc_left = 0;
    dbc_rt = − dbc;
end if;
    kscale_l = 1 − dbc_left
    kscale_r = 1 − dbc_rt
```

Thus, the differential brake control logic block 72 will output values for kscale_l and kscale_r which both range from 0 to 1, depending on the value of dbc. These scaling factors kscale_l and kscale_r are provided to left and right multipliers 74 and 76, respectively. The left multiplier 74 and right multiplier 76 in turn multiply the wheel brake command Cmd by kscale_l and kscale_r, respectively, thereby producing left wheel and right wheel brake command signals "l_cmd" and "r_cmd".

Accordingly, it will be appreciated that if dbc>0, a right turn is desired via differential braking. As dbc approaches +1, kscale_l approaches 0 and kscale_r is equal to 1. Consequently, the right wheel and brake assemblies 26r receive a brake command r_cmd which is greater than the brake command l_cmd received by the left wheel and brake assemblies 26l, thereby initiating a rightward turn during braking.

Likewise, it will be appreciated that if dbc<0, a left turn is desired via differential braking. As dbc approaches −1, kscale_l is equal to 1 and kscale_r approaches 0. Consequently, the right wheel and brake assemblies 26r receive a brake command r_cmd which is less than the brake command l_cmd received by the left wheel and brake assemblies 26l, thereby initiating a leftward turn during braking.

Continuing to refer to FIG. 3, this particular embodiment utilizes wheel speed feedback as part of the antiskid brake control. Specifically, the wheel speed of each of the wheels in the left and right wheel and brake assemblies 26l and 26r is measured via a conventional wheel speed sensor or the like. The measured wheel speeds are input to a weighted average wheel speed block 80 included in the brake control system 30. As will be described in more detail below with respect to FIGS. 7-13, the weighted average wheel speed block 80 provides a weighted average wheel speed "w_ave" to the PID and antiskid controller 70 for carrying out improved closed loop antiskid brake control.

Figure 4:
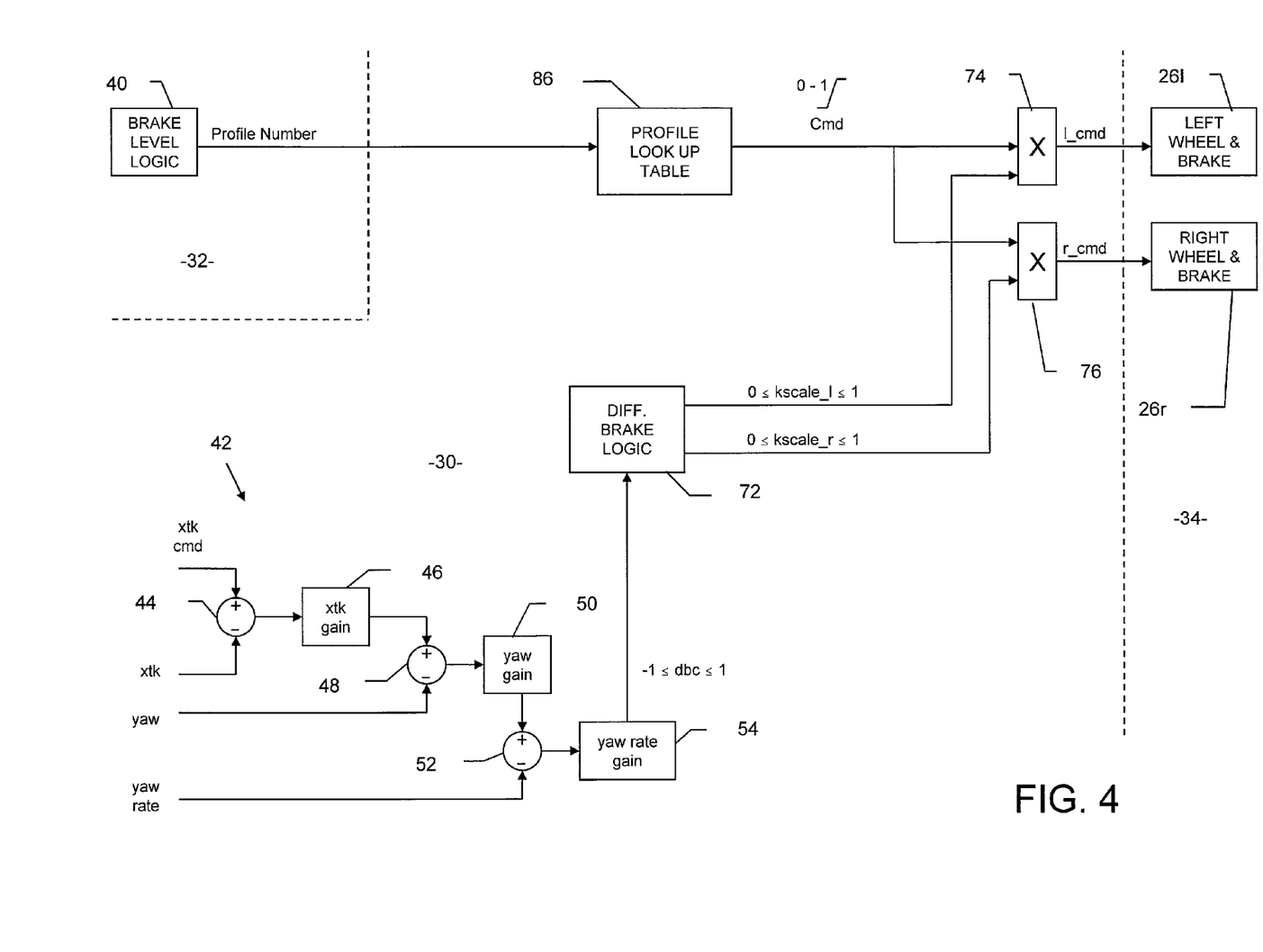
FIG. 4 is a block diagram of a brake control system with differential brake control in accordance with a second exemplary embodiment of the present invention.

FIG. 4 illustrates another embodiment of the invention. The brake control system 30 in this embodiment utilizes open-loop control and simplified determination of the wheel brake command Cmd. Specifically, in this embodiment the brake level logic 40 outputs a profile number indicative of a desired amount of braking. Similar to the embodiment of FIG. 3, the profile number may be based on pilot input via the brake pedals, or a calculated amount of desired braking in the case of an unmanned vehicle, for example.

The profile number is input to a profile lookup table 86 included in the brake control system. The profile lookup table 86 comprises a wheel brake command Cmd profile entry for each profile number output by the brake level logic 40. Based on the profile number, the profile lookup table 86 outputs a wheel brake command Cmd profile, again limited in range between 0 and 1, predetermined to give the desired braking, taking into account desired aircraft weight, aircraft speed, etc. Thus, the profile lookup table 86 provides a wheel brake command Cmd in place of items 60, 62, 64, 66, 68 and 70 as compared to the embodiment of FIG. 3. Since wheel speed feedback is not utilized, the embodiment of FIG. 4 also does not include the weighted average wheel speed block 80 of FIG. 3. The remaining portions of the aircraft flight electronics 32 and the brake control system 30 function as described previously in connection with the embodiment of FIG. 3. Thus, the description thereof will not be repeated.

Figure 5:
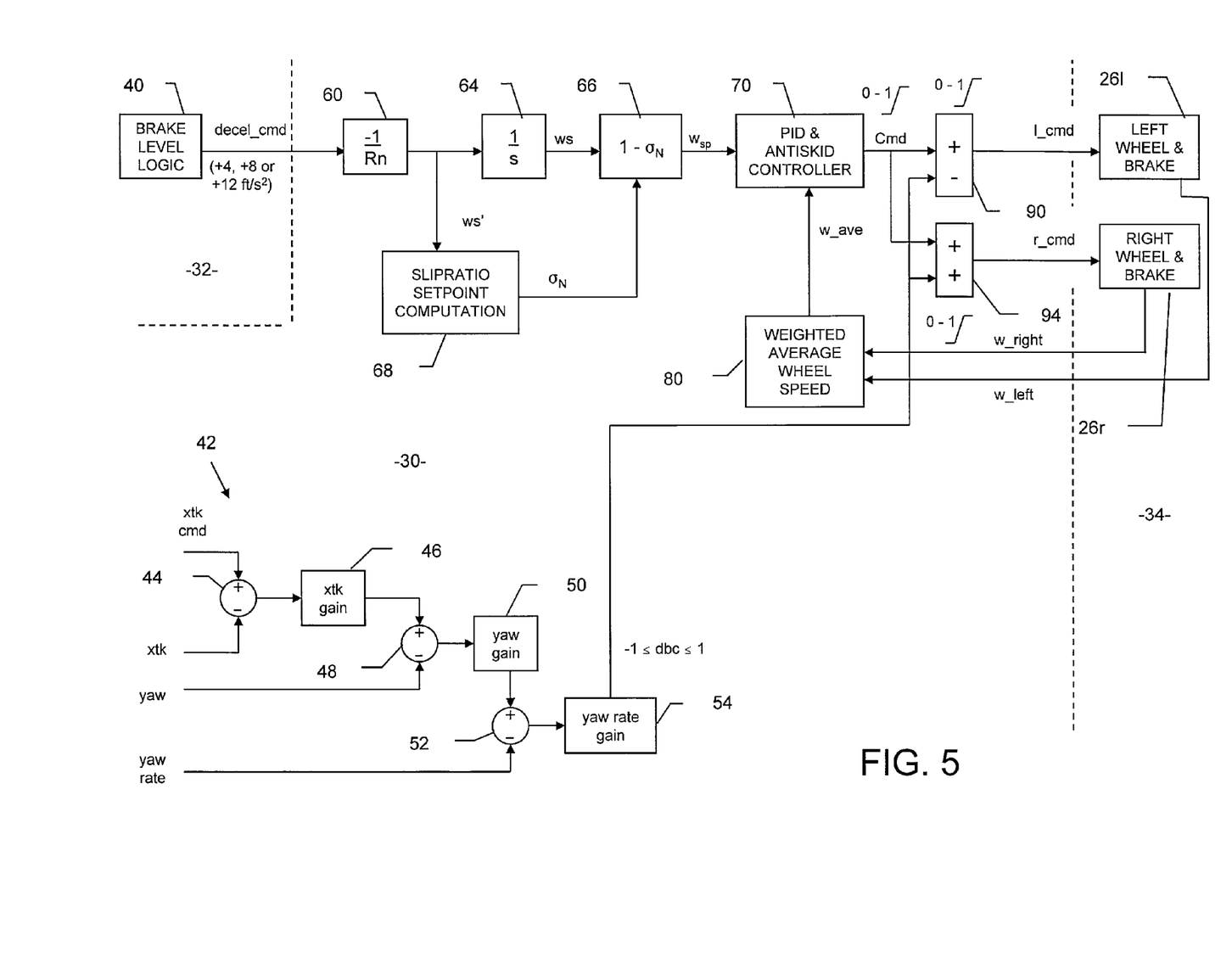
FIG. 5 is a block diagram of a brake control system with differential brake control in accordance with a third exemplary embodiment of the present invention.

Referring now to FIG. 5, a third embodiment of the present invention is shown. Similarly labeled components described above in connection with the embodiment of FIG. 3 provide the same operation with respect to the embodiment of FIG. 5. Accordingly, the embodiment of FIG. 5 will be explained in detail only with respect to the primary differences between the embodiments.

More particularly, the embodiment of FIG. 5 foregoes the brake gain adjustment logic 62 of FIG. 3. Rather, the wheel speed deceleration output from the multiplier 60 is input directly into the integrator 64. Further, an adder 90 replaces the multiplier 74 in the embodiment of FIG. 3. Similarly, an adder 94 replaces the multiplier 76 in the embodiment of FIG. 3.

The wheel brake command Cmd output from the PID and antiskid controller 70 is input to positive terminals of both adder 90 and adder 94. The differential brake control value "dbc" from the yaw rate amplifier 54 is input directly to a negative terminal of the adder 90, and to a positive terminal of the adder 94. The outputs of the adders 90 and 92 represent the first wheel and second wheel brake commands I_cmd and r_cmd to the left and right wheel and brake assemblies 26l and 26r, respectively.

Accordingly, it will be appreciated that if dbc>0, again a right turn is desired 25 via differential braking. As dbc approaches +1, I_cmd will approach 0 and r_cmd will approach 1. Consequently, the right wheel and brake assemblies 26r receive a brake command r_cmd which is greater than the brake command I_cmd received by the left wheel and brake assemblies 26l, thereby initiating a rightward turn during braking.

Likewise, if dbc<0, a left turn is desired via differential braking. As dbc approaches −1, I_cmd will approach 1 and r_cmd will approach 0. Consequently, the right wheel and brake assemblies 26r receive a brake command r_cmd which is less than the brake command I_cmd received by the left wheel and brake assemblies 26l, thereby initiating a leftward turn during braking.

As will be appreciated, in the embodiment of FIG. 5 a differential brake component is both added to one side and subtracted from the other to effect differential braking. Conversely, in the embodiment of FIG. 3 the braking on one side is essentially maintained while the braking on the other side is reduced to effect differential braking.

Figure 6:
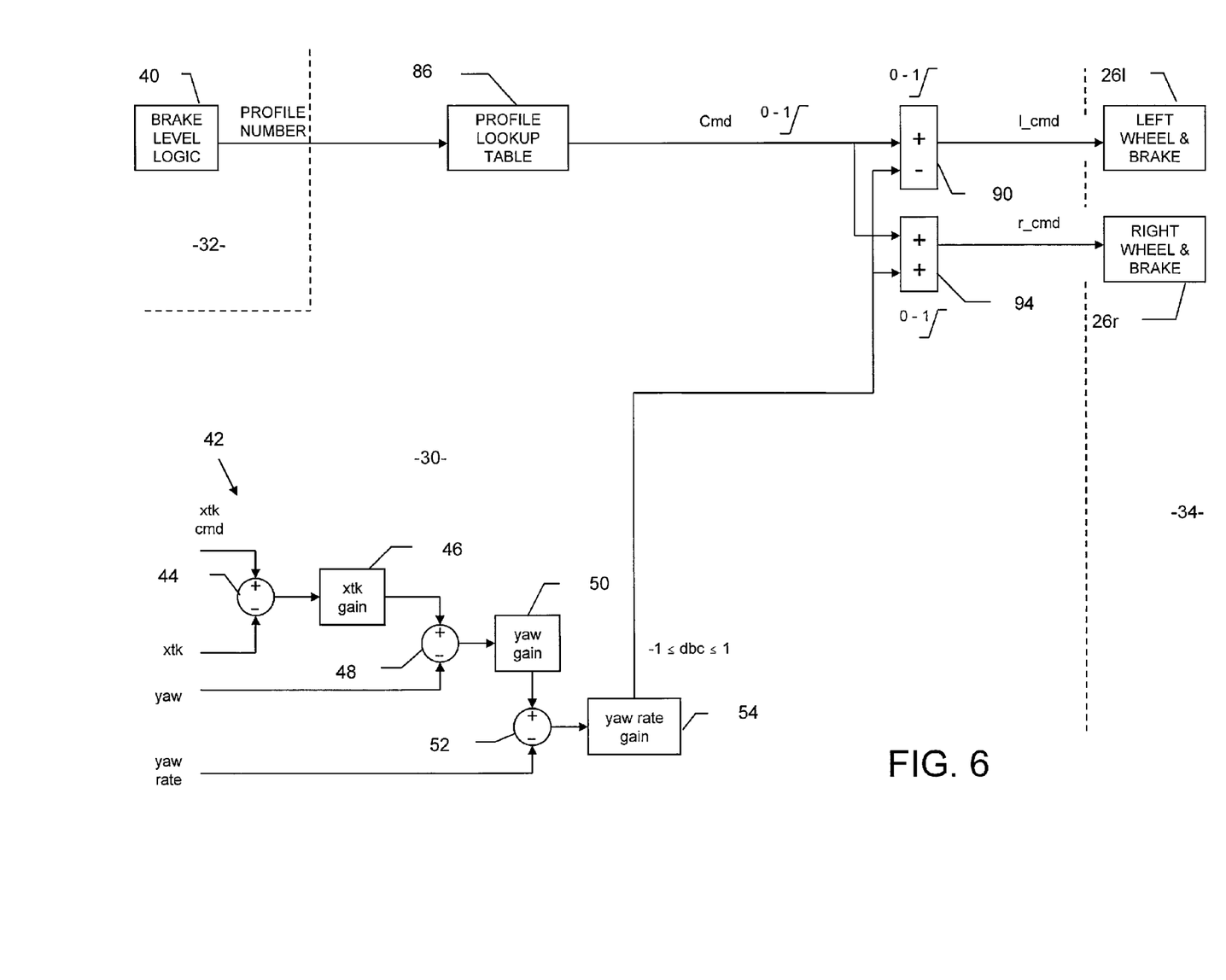
FIG. 6 is a block diagram of a brake control system with differential brake control in accordance with a fourth exemplary embodiment of the present invention.

Referring briefly to FIG. 6, a corresponding open-loop embodiment of FIG. 5 is shown. Similar to the embodiment of FIG. 4, the profile lookup table 86 provides a wheel brake command Cmd profile in place of items 60, 64, 66, 68 and 70. The wheel brake command Cmd profile in this case is limited to between 0 and 1 as in the embodiment of FIG. 5.

It will be appreciated that the particular embodiments described herein implement differential braking by maintaining the amount of braking provided to one wheel while changing the amount of braking provided to the other wheel (e.g., FIGS. 3 and 4); or by reducing the amount of braking provided to one wheel while increasing the amount of braking provided to the other wheel (e.g., FIGS. 5 and 6). The present invention may be implemented in either manner, or any combination thereof without departing from the scope of the invention.

Another aspect of the invention relates to improving brake control that relies on wheel speed feedback as in the embodiments of FIGS. 3 and 5. As the radius of different wheels will differ as a function of load, inflation, wear, etc., the wheels on the aircraft do not necessarily all rotate at the same speed. In the case of multiple wheels configured to receive a single brake command, it is necessary to merge the multiple wheel speeds to produce a single wheel speed feedback signal. For sake of explanation, it will be assumed that a single left and right wheel on are paired to receive the same brake command within the brake control system. It will be appreciated, however, that the same principles described herein may be extended to any number of wheels.

One approach for arriving at a single wheel speed feedback may be to use the highest measured wheel speed among the left and right wheels. However, such an approach is unsuitable for purposes of antiskid control. If the left wheel goes into a skid, the wheel speed of the left wheel will be lower than the wheel speed of the right wheel so that the wheel speed of the right wheel will be used for antiskid control. Since the right wheel is not in a skid, brake pressure will not be released and the left wheel will stay in a skid. This, of course, is not acceptable.

Another option would be to utilize the lowest measured wheel speed among the left and right wheels. In the case of antiskid control, this would ensure that the pressure is released to both wheels. Unfortunately, there are some asymmetric conditions as mentioned above where one wheel has a smaller radius than the other (e.g., soft, worn, more load on one side, etc.). The wheel having the largest radius will therefore always be the controlling wheel.

Using a simple arithmetic average wheel speed can help to overcome the above limitations. For example, if a cross wind gust to the right occurs during a braking event, the right wheel will get smaller and the left wheel will get larger. Therefore, the right wheel will speed up and the left wheel will slow down. If the lowest wheel speed were to be used, this could introduce a transient into the brake control. However, the simple average is insensitive to such an "uncommon mode" disturbance. Disturbances due to gear walk, out of round wheels, etc. are also reduced by averaging the wheel speeds of the respective wheels.

Figure 7:
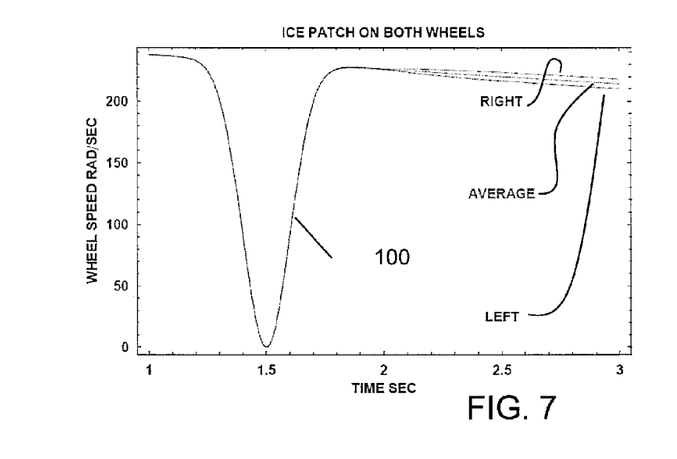
FIG. 7 is a graph representing left, right, and average wheel speed when both wheels hit an ice patch.
Figure 8:
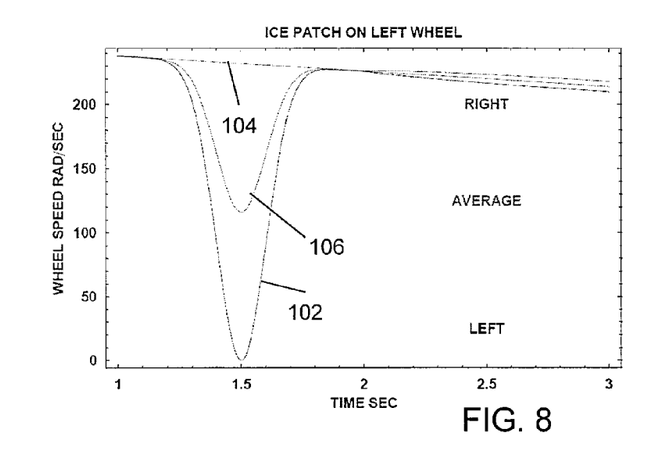
FIG. 8 is a graph representing left, right and average wheel speed when only the left wheel hits an ice patch.

Unfortunately, a simple arithmetic average causes compromises in antiskid control performance. Referring to FIGS. 7 and 8, consider for example the situation where an ice patch is encountered at 1.5 seconds followed by a cross wind disturbance to the right at 2.0 seconds. In the case of FIG. 7, both the left and right wheels encounter the ice patch at the same time. In the case of FIG. 8, only the left wheel hits the ice patch.

In the case where both wheels encounter the ice patch as represented in FIG. 7, the wheel speeds of the left and right wheels, and hence the average wheel speed, remain the same as noted at 100. Upon hitting the ice patch, the wheel speed of both wheels goes to zero before returning back to full speed. At 2.0 seconds the cross wind is encountered, causing the wheel speed of the right wheel to increase and the wheel speed of the left wheel to decrease. The average wheel speed, however, remains steady so as to average out the effects of the disturbances.

In the case where only the left wheel encounters the ice patch at 1.5 seconds as represented in FIG. 8, the wheel speed of the left wheel drops to zero as noted at 102. The wheel speed of the right wheel, on the other hand, remains steady as shown at 104. The average wheel speed is represented at 106.

By comparing the average wheel speed 106 in FIG. 8 with the average wheel speed at 100 in FIG. 7, it will be appreciated that an antiskid brake control system utilizing the average wheel speed will react differently when one wheel hits an ice patch as compared to when both wheels it an ice patch. Thus, the antiskid brake control system must be tuned to provide some type of compromise.

The present invention overcomes the above described disadvantages associated with providing brake control based on simple average wheel speeds. According to the present invention, it is possible to obtain the best of both scenarios by using the lowest wheel speed among the left and right wheels in a skid condition, and using the average of the wheel speeds at other times. Specifically, the present invention utilizes a weighted average in order to compute the average wheel speed. Referring to the embodiments of FIGS. 3 and 5, for example, the weighted average wheel speed block 80 computes a weighted average wheel speed w_ave based on the measured wheel speeds w_left and w_right.

The weighted average may be expressed as follows:

$$w\_ave = kl \cdot w\_left + kr \cdot w\_right$$

where w_ave is the average wheel speed
   w_left is the measured left wheel speed
   w_right is the measured right wheel speed
   kl is the left weighting factor
   kr is the right weighting factor The weighting factors kl and kr preferably are selected so as to have the properties:
1. kl=1 and kr=0 when left wheel is locked
2. kr=0 and kl=1 when right wheel is locked
3. kl=kr=0.5 when the wheel speeds are equal A function suitable for accomplishing this is the difference of the wheel speeds divided by the sum of the wheel speeds, also referred to as difference over sum (dos) for short. The dos has the following properties:
1. dos=0 if w_left=wright
2. dos=±1.0 if w_left or wright=0

Figure 9:
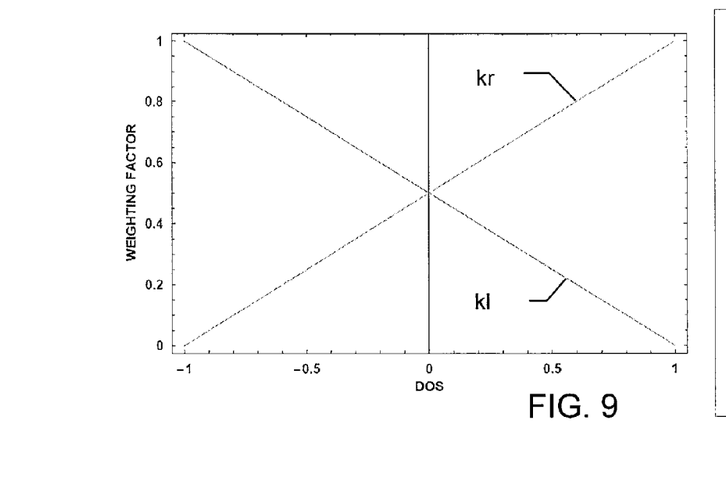
FIG. 9 is a graph representing exemplary weighting factors in accordance with an exemplary embodiment of the present invention.

FIG. 9 illustrates the weighting factors kl and kr as a function of the dos in accordance with the exemplary embodiment. As shown, the weighting factor kr increases from 0 to 1, and the weighting factor kl decreases from 1 to 0, as the dos changes from −1 to +1.

Figure 10:
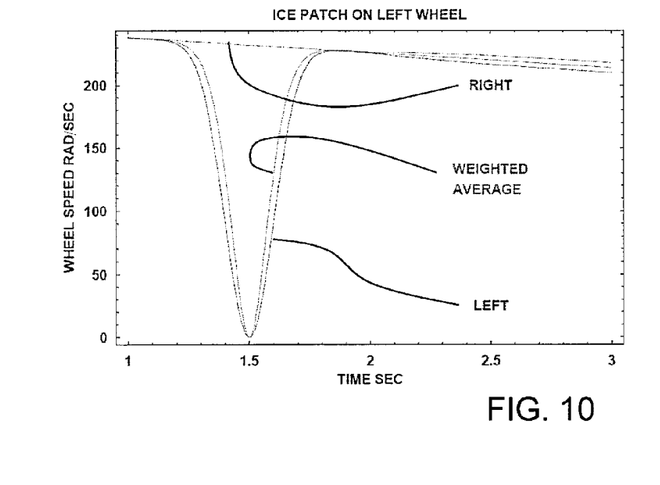
FIG. 10 is a graph representing left, right, and weighted average wheel speed in accordance with the present invention.

FIG. 10 illustrates the case where only the left wheel hits an ice patch at 1.5 seconds and a cross wind occurs at 2.0 seconds as in the previous example with respect to FIG. 8. Clearly, the weighted average wheel speed w_ave is substantially the simple average wheel speed when the wheel speeds w_left and w_right are the same, and the lowest wheel speed when one wheel (e.g., left wheel) is in a skid. When the wheels are not in a skid and the cross wind occurs, the simple average is obtained so as to remove the effects of the disturbance as is desirable.

The weighted average wheel speed as shown in FIG. 10 still tends to be slightly greater than the lowest wheel speed. Accordingly, even further improved performance can be obtained by using a non-linear, or "warped" dos factor, to produce a "warped" weighted average. For example, the dos factor may be "warped" with a parabola as follows:

$$\text{warped } dos \text{ } [dos] = (1 - \text{warp})dos|dos| + \text{warp } dos$$

where "warp" is a tuning factor that sets the amount of non linearity. Warp set to 1 is linear. This function has the following properties:
   warped dos [0]=0
   warped dos [1]=1
   warped dos [−1]=−1
for all the values of "warp". Clearly, other functions could be used but a second order polynomial is one of the simplest.

Figure 11:
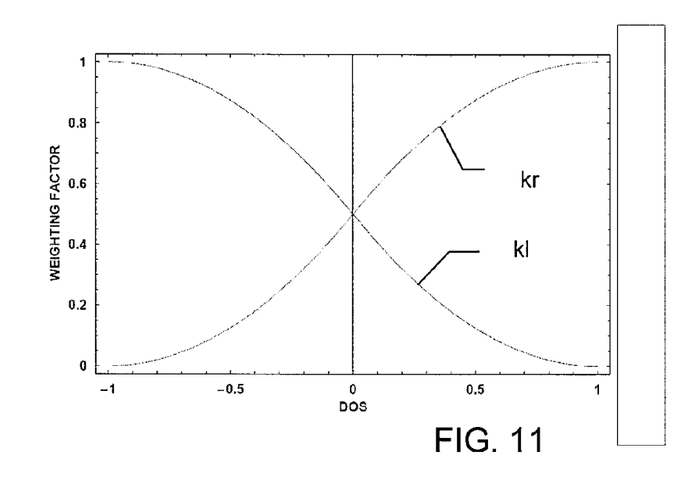
FIG. 11 is a graph representing exemplary warped weighting factors in accordance with an exemplary embodiment of the present invention.

FIG. 11 illustrates the warped weighting factors kl an kr as a function of dos for warp=2. As shown, the weighting factors kl and kr in this embodiment vary non-linearly as a function of dos. By changing the value of warp, the brake control system may be tuned for a desired response. The higher the value of warp, the more aggressively the weighting factors kl and kr are changed as will be appreciated.

Figure 12:
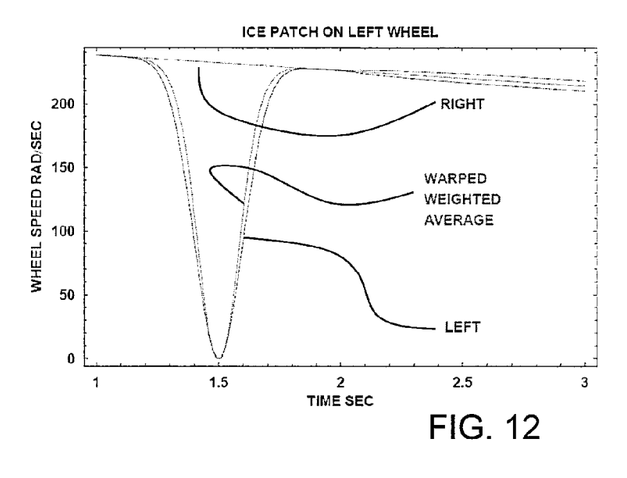
FIG. 12 is a graph representing left, right, and warped weighted average wheel speed when only the left wheel hits an ice patch in accordance with the present invention.

FIG. 12 illustrates the case analogous to that of FIG. 10 with the exception that a warped weighted average (warp=2) is utilized in FIG. 12 as opposed to the zero warp in FIG. 10. As can be seen, the difference between weighted average wheel speed and the lowest wheel speed when one wheel (e.g., left wheel) is in a skid is further reduced.

Figure 13:
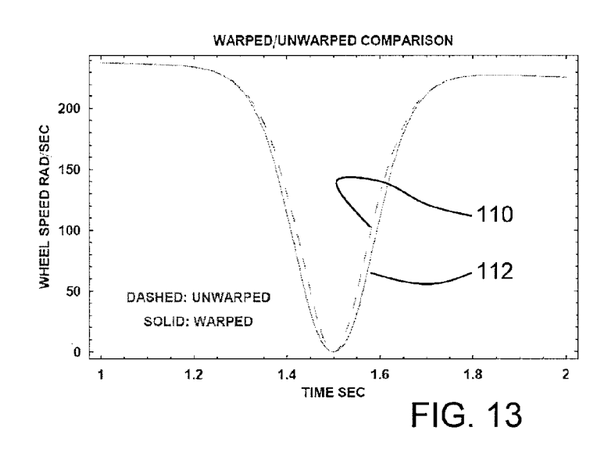
FIG. 13 is a graph comparing non-warped and warped weighted averaging in accordance with the present invention.

FIG. 13 represents a comparison of the weighted average wheel speed in the case where non-warped weighting factors are utilized (shown by line 110) and warped weighting factors are utilized (warp=2) (shown by line 112). Such comparison illustrates how the warped weighting factors may follow the lowest wheel speed even more closely.

Accordingly, by using a weighted average wheel speed a more accurate average wheel speed may be computed, thereby leading to more accurate antiskid control. Although the exemplary embodiment calculates the weighted average wheel speed based on a difference of sum (dos) approach, the weighted average may be computed using other type averages without departing from the scope of the invention.

Although the invention has been shown and described with respect to certain preferred embodiments, it is obvious that equivalents and modifications will occur to others skilled in the art upon the reading and understanding of the specification. For example, the invention has be described herein primarily in the context of an electric brake system utilizing electromechanical actuators driven by the respective differential brake commands. However, the present invention equally applies to other types of brake systems such as hydraulic brake systems in which respective differential brake commands serve to drive corresponding valves or the like within the system. The present invention includes all such equivalents and modifications, and is limited only by the scope of the following claims.

What is claimed is:

1. A differential brake control system for a vehicle having a first wheel and a second wheel on respective sides of a vertical axis of the vehicle, comprising:
   processing logic for computing a wheel brake command based on an input brake command indicative of a desired amount of braking; and
   differential logic for adjusting the wheel brake command by a first amount and a second amount to produce a first wheel command and a second wheel brake command, respectively, the first amount being different from the second amount,
   wherein the differential logic adjusts the wheel brake command by the first amount and the second amount, by adding a differential component to the wheel brake command to produce the first wheel brake command and subtracting a differential component from the wheel brake command, to produce the second wheel brake command.

2. The brake control system of claim 1, wherein the first amount and the second amount are a function of a measured yaw of the vehicle.

3. The brake control system of claim 2, wherein the first amount and the second amount are a function of a measured yaw rate.

4. The brake control system of claim 3, wherein the first amount and the second amount are a function of a measured lateral offset of the vehicle relative to a centerline.

5. The brake control system of claim 4, wherein the differential logic compares the lateral offset with a desired position of the vehicle relative to the centerline to produce a yaw command.

6. The brake control system of claim 5, wherein the differential logic compares the yaw command with the measured yaw of the vehicle to produce a yaw rate command.

7. The brake control system of claim 6, wherein the differential logic compares the yaw rate command with the measured yaw rate to produce a yaw rate error.

8. The brake control system of claim 7, wherein the first amount and the second amount are determined based on the yaw rate error.

9. The brake control system of claim 1, comprising brake gain adjustment logic for effectively adjusting the magnitude of the wheel brake command as a function of the degree of differential braking between the first wheel command and the second wheel brake command.

10. The brake control system of claim 9, wherein the brake gain adjustment logic effectively reduces the magnitude of the wheel brake command in response to an increase in the degree of differential braking.

11. The brake control system of claim 10, wherein the magnitude of the wheel brake command is effectively reduced by approximately 50% during full differential braking.

12. A logic system for computing a weighted average wheel speed among at least a left wheel and a right wheel undergoing anti-skid brake control, comprising:
an input for receiving measured wheel speeds of the left wheel and the right wheel;
processing logic for computing a weighted average wheel speed wave represented as follows:

$$w\_ave = kl * w\_left + kr * w\_right$$

where
w_left is the measured wheel speed of the left wheel;
w_right is the measured wheel speed of the right wheel;
kl is a left weighting factor; and
kr is a right weighting factor, wherein the left weighting factor kl and the right weighting factor kr vary as a function of a difference in the measured wheel speeds of the left wheel and the right wheel.

13. The logic system of claim 12, wherein the left weighting factor kl and the right weighting factor kr vary as a function of a difference over sum (dos) of the left wheel speed and the right wheel speed.

14. The logic system of claim 13, wherein the left weighting factor kl and the right weighting factor kr vary as a function of the dos combined with a non-linear component.

15. The logic system of claim 14, wherein the non-linear component is represented by a parabola.

16. The logic system of claim 12, wherein the weighting factors kl and kr are selected so as to have the properties: kl=1 and kr=0 when left wheel is locked;
kr=0 and kl=1 when right wheel is locked; and
kl=kr=0.5 when the wheel speeds are equal.

17. An antiskid brake control system for a vehicle, comprising the logic system of claim 12.

18. A differential brake control system for a vehicle having a first wheel and a second wheel on respective sides of a vertical axis of the vehicle, comprising:
processing logic for computing a wheel brake command based on an input brake command indicative of a desired amount of braking; and
differential logic for adjusting the wheel brake command by a first amount and a second amount to produce a first wheel brake command and a second wheel brake command, respectively, the first amount being different from the second amount,
wherein the first amount and the second amount are a function of a measured yaw of the vehicle and a function of a measured yaw rate, and wherein the first amount and the second amount are a function of a measured lateral offset of the vehicle relative to a centerline.

* * * * *